(12) United States Patent
Shimoi et al.

(10) Patent No.: US 7,993,786 B2
(45) Date of Patent: Aug. 9, 2011

(54) FUEL CELL SYSTEM

(75) Inventors: Ryoichi Shimoi, Yokohama (JP);
Tetsuya Mashio, Yokosuka (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1103 days.

(21) Appl. No.: 11/720,108

(22) PCT Filed: Nov. 23, 2005

(86) PCT No.: PCT/IB2005/003521
§ 371 (c)(1),
(2), (4) Date: May 24, 2007

(87) PCT Pub. No.: WO2006/077463
PCT Pub. Date: Jul. 27, 2006

(65) Prior Publication Data
US 2008/0008913 A1    Jan. 10, 2008

(30) Foreign Application Priority Data

Nov. 26, 2004 (JP) .................................. 2004-342966

(51) Int. Cl.
*H01M 8/04* (2006.01)
*H01M 8/24* (2006.01)
(52) U.S. Cl. ......... 429/429; 429/428; 429/443; 429/454
(58) Field of Classification Search .................. 429/429, 429/428, 443, 454
See application file for complete search history.

(56) References Cited

U.S. PATENT DOCUMENTS

| | | | |
|---|---|---|---|
| 2001/0014415 A1 | 8/2001 | Iio | |
| 2002/0076583 A1* | 6/2002 | Reiser et al. | 429/13 |
| 2004/0067399 A1 | 4/2004 | Kobayashi | |
| 2004/0229088 A1* | 11/2004 | Hayashi et al. | 429/13 |

FOREIGN PATENT DOCUMENTS

| | | | |
|---|---|---|---|
| JP | 55-154075 | | 1/1980 |
| JP | 07-240220 | * | 9/1995 |
| JP | 08-222259 | | 8/1996 |
| JP | 2002-231294 | | 8/2002 |
| JP | 2002-237322 | | 8/2002 |
| JP | 2003-178782 | | 6/2003 |

(Continued)

*Primary Examiner* — Helen O Conley
(74) *Attorney, Agent, or Firm* — Young Basile

(57) ABSTRACT

The disclosure describes fuel cell systems including a fuel cell stack that generates electricity, an exhaust valve that externally vents a fuel gas from a fuel chamber of the fuel cell stack, and a controller that computes an estimated time to replace an oxidant gas in at least the fuel chamber with a newly supplied fuel gas, wherein at a time of starting-up the fuel cell system the controller maintains the exhaust valve in an open position for the estimated time. In some embodiments, the controller computes the estimated time as a summation of a first time T1 measured from the fuel cell start-up time to a time when contents of a supply conduit are replaced with fuel gas, a second time T2 measured from the time when contents of a supply conduit are replaced with fuel gas to a time when contents of the fuel chamber are replaced with fuel gas, and a third time T3 measured from the time when contents of the fuel chamber are replaced with fuel gas to a time when contents of the exhaust conduit are replaced with fuel gas. The disclosure further describes methods of operating a fuel cell system, particularly during fuel cell start-up.

39 Claims, 6 Drawing Sheets

FOREIGN PATENT DOCUMENTS

| | | |
|---|---|---|
| JP | 2003-317766 | 11/2003 |
| JP | 2004-139984 | 5/2004 |
| JP | 2004-193107 | 7/2004 |
| JP | 2004-296351 | 10/2004 |
| WO | WO 03/096460 A1 | 11/2003 |

\* cited by examiner

FUEL CELL SYSTEM

This application claims priority from Japanese Patent Application No. 2004-342966, filed Nov. 26, 2004, the entire contents of which is incorporated herein by reference.

TECHNICAL FIELD

The present disclosure relates to fuel cell systems, more particularly, controlling fuel cell system operation.

BACKGROUND

In a fuel cell system, a fuel gas such as hydrogen and an oxidizer gas containing oxygen are electrochemically reacted across an electrolyte to produce electrical energy. Conventional fuel cell systems contain one or more unit fuel cells including generally a fuel electrode coated with a redox catalyst layer, an oxidizing electrode coated with a redox catalyst layer, and an electrolyte film separating the electrodes and having a gas passage formed to supply oxidizer gas (e.g. air) to the oxidizing electrode (e.g. cathode) in an oxidizer electrode chamber, and fuel gas (e.g. hydrogen) to the fuel electrode (e.g. anode) in a fuel electrode chamber.

Conventional fuel cell systems may include pipes for supplying and exhausting oxidizing gas and fuel gas to and from the fuel cell stack. However, since only a portion of the oxidizing gas and the fuel gas supplied to the fuel cell generally reacts within the respective oxidizing electrode chamber and fuel electrode chamber, the gas exhausted from a fuel cell stack may be rich in unreacted fuel gas and/or oxidizer gas. This leads to fuel cell operating inefficiency and waste of expensive fuel gas.

Although various methods have been developed to monitor the exit concentration of the exhaust gas from an operating fuel cell and adjust the operating parameters of the fuel cell system to achieve higher fuel gas conversion, these methods generally require expensive gas concentration detection instrumentation that adds substantially to the cost of a fuel cell system. Moreover, the existing gas concentration monitoring systems may suffer from operating instability and gas detection interferences. For example, gas detection monitors which operate by monitoring the thermal conductivity or infrared absorbance of the exhaust gas may respond non-selectively to gases other than the fuel gas, for example, water vapor or carbon dioxide. This may provide a false indication of the fuel gas concentration in the fuel cell system exhaust and lead to selection of improper fuel cell operating parameters. Selection of improper fuel cell operating parameters can seriously degrade fuel cell operating efficiency, long term cycling performance and fuel cell life.

SUMMARY

In general, the invention relates to techniques for controlling fuel cell systems during start-up. In certain embodiments, a fuel cell system includes a fuel cell stack having multiple unit fuel cells, a voltage sensor electrically connected to the fuel cell stack, a fuel gas supply conduit, a fuel gas exhaust conduit, a fuel gas recirculation conduit connecting between the fuel gas exhaust conduit and the fuel gas supply conduit at a diversion point, and a fuel gas vent valve positioned in the fuel gas exhaust conduit downstream from the diversion point. The fuel gas vent valve vents at least a portion of the fuel gas within the fuel gas exhaust conduit to an atmosphere external to the fuel cell stack in response to a fuel gas control process executed by a controller in response to a fuel cell operating voltage detected by the voltage sensor.

In some exemplary embodiments, the fuel cell system includes a fuel gas recirculation valve positioned to divert a portion of the fuel gas from the fuel gas exhaust conduit and recirculate the diverted portion of the fuel gas to the fuel gas supply conduit. In other exemplary embodiments, the fuel cell system includes a compressor in flow communication with the fuel gas recirculation conduit. In additional exemplary embodiments, a first check valve is positioned in the fuel gas exhaust conduit upstream of the fuel exhaust valve and downstream of the diversion point to allow irreversible flow of fuel gas through the fuel gas exhaust valve. In other additional embodiments, a second check valve is positioned in the fuel recirculation conduit upstream of the first check valve and downstream of the diversion point to allow irreversible flow of fuel gas to the fuel gas supply conduit.

In certain other embodiments, a method includes supplying fuel gas to the fuel cell chamber at a fuel cell start-up time with the fuel gas vent valve in an open position, maintaining the fuel gas vent valve in an open position for a time period corresponding to an estimated gas replacement completion time, and closing the fuel gas vent valve after the estimated gas replacement completion time has elapsed.

In one exemplary embodiment, the estimated gas replacement completion time is determined as a summation T of a first replacement estimation time T1 estimating a time from the fuel cell start-up time to the time when the contents of the fuel gas supply conduit are replaced with fuel gas, a second replacement estimation time T2 estimating a time from the time when the contents of the fuel gas supply conduit are replaced with fuel gas to the time when the contents of the fuel chamber are replaced with fuel gas, and a third replacement estimation time T3 estimating a time from the time when the contents of the fuel chamber are replaced with fuel gas to the time when the contents of the fuel gas exhaust conduit are replaced with fuel gas.

In other exemplary embodiments, the second replacement estimation time T2 is calculated according to the equation (Vstack/Vin)×T1, wherein Vstack is the volume defined by the fuel electrode chamber, Vin is the volume defined by the fuel gas supply conduit, and T1 is the first replacement estimation time T1. The third replacement estimation time T3 is calculated according to the equation (Vout/Vin)×T1, wherein Vout is the volume of the fuel gas exhaust conduit, Vin is the volume of the fuel gas supply conduit, and T1 is the first replacement estimation time T1. In still other exemplary embodiments, the third replacement estimation time T3 is calculated according to the equation (Vout/Vin)×T1, wherein Vout is the volume of the fuel gas exhaust conduit, Vin is the volume of the fuel gas supply conduit, and T1 is the first replacement estimation time.

According to certain additional embodiments, the gas replacement completion time may be estimated based on the voltage information determined by the voltage sensor electrically connected to the fuel cell stack. In certain exemplary embodiments, the second replacement estimation time T2 may be determined by dividing the voltage sensed by the voltage sensor by the number of unit fuel cells in the fuel cell stack to obtain a voltage per unit fuel cell of the fuel cell stack, performing a linear approximation to the variation in voltage per unit fuel cell as a function of time from start-up to determine initial slope values, and comparing the initial slope values to a target slope value and setting replacement estimation time T2 to the elapsed time from fuel cell start-up required for the initial slope values to equal the target slope value. In other exemplary embodiments, the target voltage may be changed according to the slope of the linear approximation to the variation in voltage per unit fuel cell as a function of time from start-up when the second replacement estimation time T2 is determined.

In certain embodiments, the fuel cell control methods include supplying fuel gas to the fuel cell chamber of at a fuel cell start-up time with the fuel gas vent valve in an open position, maintaining the fuel gas vent valve in an open position for a time period corresponding to the estimated gas replacement completion time, and closing the fuel gas vent valve after the estimated gas replacement completion time has elapsed.

According to the present disclosure, the gas replacement completion time is estimated based on the voltage information determined by a voltage detection means (e.g. a voltage sensor) connected to and monitoring the electric power generation of the fuel cell stack. Therefore, without using a gas concentration sensor, the deterioration of the catalyst layer resulting from exposure to a mixture of fuel gas and oxidizer gas during fuel cell start-up can be controlled, and the reliability and durability of the fuel cell system improved.

Certain aspects of the invention may provide fuel cell systems exhibiting improved operating efficiency. Other aspects of the invention may provide lower cost fuel cell systems that may not require gas concentration sensors to monitor fuel conversion efficiency. In other aspects, the invention may provide improved fuel cell system operating and control methods that reduce deterioration of the fuel cell electrode catalyst layers resulting from exposure to the mixture of fuel gas and oxidizer gas during fuel cell start-up.

The above summary of the invention is not intended to describe each embodiment or every implementation of the invention. Exemplary embodiments of the invention are described below and illustrated by the following drawings. In particular, each embodiment described below is not limited to fuel cell systems suitable for use in fuel cell powered vehicles. Rather, the invention may also be applied to fuel cell systems for use in other applications. The details of one or more embodiments of the invention are set forth in the accompanying drawings and the description below. Other features, objects, and advantages of the invention will be apparent from the description and drawings, and from the claims.

DETAILED DESCRIPTION

Figure 1:
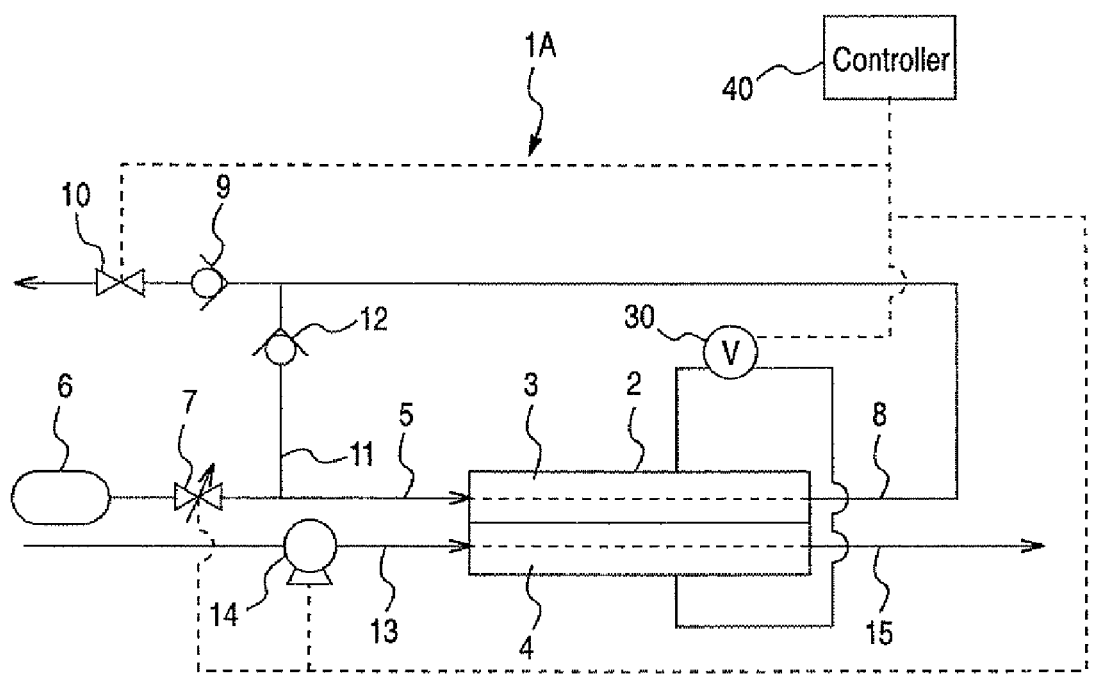
FIG. 1 is a schematic diagram illustrating a fuel cell system according to a first embodiment.
Figure 2:
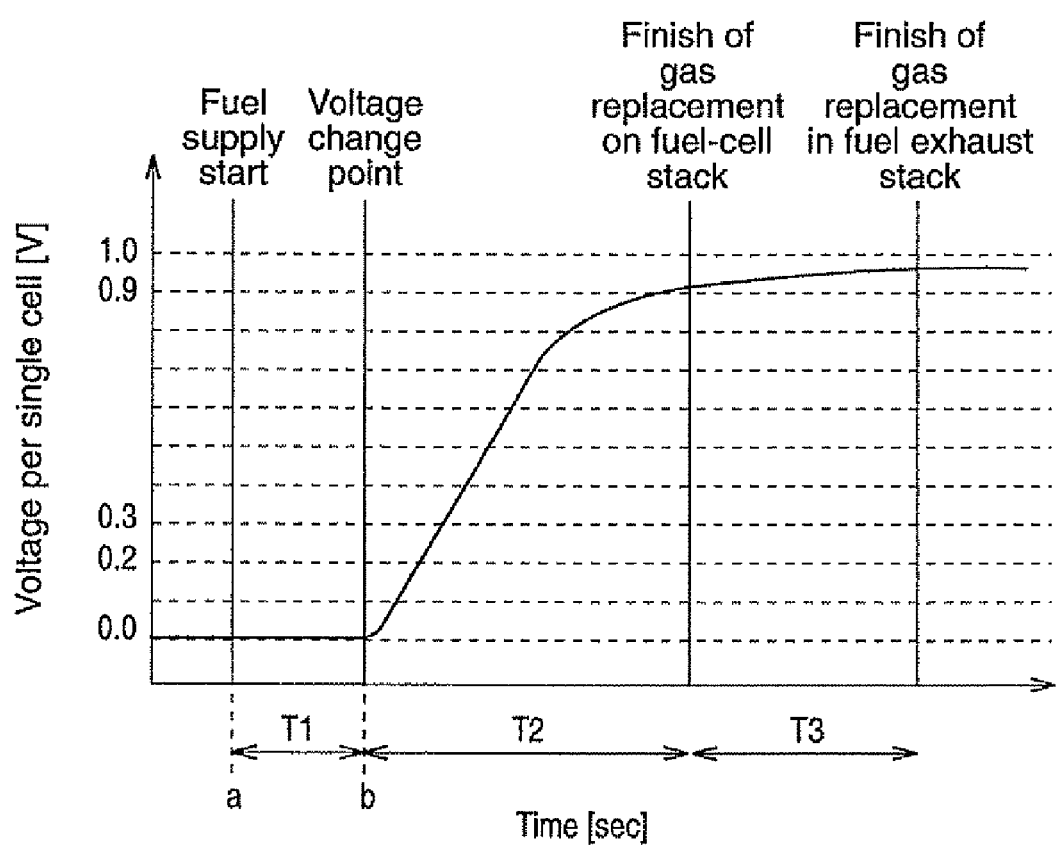
FIG. 2 is a diagram illustrating a characteristic graphical relationship between the fuel cell operating voltage as a function of time measured using a voltage sensor during fuel cell start-up, and describing one embodiment of the estimation procedure for determining the gas replacement completion time.

FIG. 1 is a schematic diagram of a first embodiment of a fuel cell system 1A. FIG. 2 is a characteristic line graph showing voltage of fuel cell stack 2 upon start of the fuel cell and illustrates an estimation procedure of the gas replacement completion time.

In FIG. 1, fuel cell system 1A is equipped with fuel cell stack 2. Fuel cell stack 2 is equipped with fuel electrode 3 facing the fuel chamber and oxidizer electrode 4 facing the oxidizer gas chamber. In fuel cell stack 2, the voltage detection means 30 (for example, a voltage sensor) is electrically connected to the fuel cell system 1A and detects a voltage produced by the electric power generation of fuel electrode 3 and oxidizer electrode 4. The voltage detected by the voltage detection means 30 is output to a controller 40.

With respect to fuel gas supply conduit (e.g. fuel gas supply means) 5, one end is connected to fuel tank 6, and the other end is connected to the entry of the fuel chamber of the fuel cell stack 2. Fuel gas (e.g. hydrogen gas) is used to fill fuel tank 6. The fuel gas supply valve 7 is positioned in fuel gas supply conduit 5. The fuel gas supply valve 7 can adjust the flow volume and pressure of fuel gas supplied from fuel tank 6 to fuel cell stack 2 under process control by controller 40.

With respect to fuel gas exhaust conduit (fuel gas exhaust means) 8, one end is connected to the exit of the fuel chamber of fuel cell stack 2, and the other end is open to the outside air. Return check valve 9 and fuel gas vent valve 10 are positioned in flow communication with fuel gas exhaust conduit 8, close to the vent to the outer atmosphere. Return check valve 9 prevents the outside air from flowing back into fuel gas exhaust conduit 8. The fuel gas vent valve 10 opens and closes fuel gas exhaust conduit 8 and is controlled by controller 40.

With respect to fuel gas recirculation conduit (fuel gas recirculation means) 11, one end is connected at an upstream position relative to the fuel gas vent valve 10 and return check valve 9 of fuel gas exhaust conduit 8. The other end is connected to the fuel gas supply conduit 5 at a downstream position relative to the fuel gas supply valve 7 of fuel gas supply conduit 5. More specifically, fuel gas recirculation conduit 11 diverges from fuel gas exhaust conduit 8 at a diversion point and recirculates fuel gas to fuel gas supply conduit 5.

In some embodiments, the length of fuel gas recirculation conduit 11 may be set, at least, to be shorter than the length of fuel gas exhaust conduit 8. Return check valve 12 may be positioned in fuel gas recirculation conduit 11. Return check valve 12 prevents fuel gas from flowing out to fuel gas exhaust conduit 8 without passing through fuel cell stack 2 from fuel gas supply conduit 5 during steady-state fuel cell operation.

With respect to oxidizer gas supply conduit (oxidizer gas charging means) 13, one end is open to the outside environment (e.g. the external air), and the other end is connected to the entry of the oxidizer gas chamber of fuel cell stack 2, Oxidizer gas compressor 14 is connected to oxidizer gas supply conduit 13. With this oxidizer gas compressor 14, an oxidizer gas (e.g. the ambient air from an external environment) may be supplied to fuel cell stack 2 through oxidizer gas supply conduit 13. The operation of oxidizer gas compressor 14 may be controlled by controller 40.

With respect to oxidizer gas exhaust conduit (oxidizer gas exhaust means) 15, one end is connected to the exit of the oxidizer gas chamber of fuel cell stack 2, and the other end is open to the outside environment (e.g. the external air) In the above fuel cell system 1A, oxidizer gas exhausted through the oxidizer gas conduit 15 from the oxidizer electrode 4 may be recirculated for reuse in the oxidizer chamber of the fuel cell (not shown in FIG. 1) provided that the water generated by reaction of oxidizer and fuel in the fuel cell system 1A is removed. Alternatively, the oxidizer exhaust gas may be combined with the fuel gas exhaust downstream of the fuel gas vent valve 10 (not shown in FIG. 1) in order to dilute unreacted fuel in the fuel gas exhaust.

The controller 40 controls fuel cell system 1A as described above. For example, the controller 40 executes a fuel gas control process in response to a voltage detected by the voltage sensor (voltage detection means) 30 during fuel cell start-up. In one embodiment, the fuel gas control process includes supplying fuel gas to the fuel cell chamber at a fuel cell start-up time with the fuel gas vent valve in an open position, maintaining the fuel gas vent valve in an open position for a time period corresponding to the estimated gas replacement completion time, and closing the fuel gas vent valve after the estimated gas replacement completion time has elapsed.

In addition, controller 40 estimates a gas replacement completion time T (i.e., the time elapsed from the time when the fuel supply to fuel gas supply conduit 5 to fuel cell stack 2 starts to the time when the oxidizer gas is substantially completely replaced with fuel gas in fuel gas supply conduit 5, the fuel chamber of fuel cell stack 2, and fuel gas exhaust conduit 8) based on the voltage detection information of the voltage detection means 30. The gas replacement operation and the estimation procedure of the gas replacement completion time are described in further detail below.

Operation of the above fuel cell system 1A upon fuel cell start-up will now be described. When the fuel cell start mode is initiated by the controller 40, the controller 40 opens the valve 10 for the fuel gas exhaust conduit 8 and starts to supply fuel gas from fuel tank 6. The valve 7 for the fuel gas supply volume adjustment remains closed until the pressure of this fuel gas reaches a higher pressure than normal operation. When the pressure of fuel gas reaches a set high pressure, controller 40 opens the valve 7 for the fuel gas supply volume adjustment to start the fuel supply. The high pressure fuel gas flows into fuel gas supply conduit 5, the fuel chamber of fuel cell stack 2 and the fuel gas exhaust conduit 8 in that order. The oxidizer gas is replaced with fuel gas in this manner.

The controller 40 estimates the gas replacement completion time T, that is the elapsed time from fuel cell start-up to the time when the contents of fuel gas supply conduit 5, the fuel chamber of fuel cell stack 2, and fuel gas exhaust conduit 8 are replaced with fuel gas. As illustrated in FIG. 2, in one embodiment the controller 40 determines and stores a fuel supply start time (time a), and monitors the detected voltage of the voltage detection means 30 after the fuel supply starts. In addition, the controller 40 detects and stores the point in time where the detected voltage of the voltage detection means 30 starts to rise from zero (time b). The controller 40 then estimates the gas replacement completion time T, e.g., by using one of the following exemplary estimation methods.

As shown in FIG. 2, controller 40 may compute the estimated gas replacement completion time T as a summation of the first replacement estimation time T1, which is measured from the time when the fuel supply starts to the time when the contents of the fuel gas supply conduit 5 are replaced with fuel gas; the second replacement estimation time T2, which is measured from the time when the contents of the fuel gas supply conduit 5 are replaced with fuel gas to the time when the contents of the fuel chamber of fuel cell stack 2 are replaced with fuel gas; and the third replacement estimation time T3, which is measured from the time when the contents of the fuel chamber of fuel cell stack 2 are replaced with fuel gas to the time when the contents of the fuel gas exhaust conduit 8 are replaced with fuel gas.

The first replacement estimation time T1 may be determined by time point "b" in FIG. 2, which is measured from time point "a" in FIG. 2 when the fuel supply is started, to the time when the detected voltage of the voltage detection means 30 first starts to rise. The second replacement estimation time T2 may be determined by the following calculation: the volume of the fuel chamber of fuel cell stack 2, Vstack, is divided by the volume of fuel gas supply conduit 5, Vin, and the divided value is multiplied by first replacement estimation time T1, that is, $T2=(Vstack/Vin) \times T1$. The third replacement estimation time T3 may be determined by the following calculation: the volume of fuel gas exhaust conduit 8, Vout, divided by the volume of fuel gas supply conduit 5, Vin, and the resultant value multiplied by first replacement estimation time T1, that is $T3=(Vout/Vin) \times T1$.

When the controller 40 reaches the estimated gas replacement completion time T, the controller closes fuel gas vent valve 10. As a result, the controller 40 prevents fuel gas from being exhausted to the outside air upon determining that the replacement of oxidizer gas by fuel gas in the fuel gas supply conduit 5 is completed. If the fuel gas vent valve 10 is closed, fuel gas in fuel gas exhaust conduit 8 returns to fuel gas supply conduit 5 through fuel gas recirculation conduit 11 and is re-supplied to fuel cell stack 2.

In addition, the controller 40 starts to drive oxidizer gas compressor 14 after fuel gas vent valve 10 is closed. An oxidizer gas (e.g. air) is thus supplied to fuel cell stack 2 soon after the contents of fuel gas supply conduit 5, the fuel chamber of fuel cell stack 2, and fuel gas exhaust conduit 8 are replaced with fuel gas, and the electric power generation starts. Also, the controller 40 checks the detected voltage of the voltage detection means 30 upon expiration of the estimated gas replacement completion time. Controller 40 then adjusts the drive power of oxidizer gas compressor 14 so that the amount of oxidizer gas supplied is increased as this detected voltage is reduced.

In one embodiment, the gas replacement completion time can be estimated based on the voltage information obtained from the voltage detection means 30 electrically connected to the fuel cell stack 2 and positioned to detect voltage produced by the electric power generation of fuel cell stack 2. Fuel gas is supplied to fuel cell stack 2 by opening fuel gas vent valve 10 when the fuel cell is started up; the gas replacement completion time (that is, the elapsed time from the time when the fuel supply to fuel cell stack 2 starts to the time when an oxidizer gas is replaced with fuel gas in fuel gas supply conduit 5, fuel chamber of fuel cell stack 2, and fuel gas exhaust conduit 8) is estimated using the voltage provided by the voltage detection means 30; and fuel gas vent valve 10 is set to the closing position upon passage of the estimated gas replacement completion time relative to the start-up time.

Thus, the deterioration of the catalyst layer by exposure to a mixture of fuel gas and an oxidizer gas upon fuel cell start-up may be controlled without using an expensive and potentially unreliable gas concentration sensor, and the reliability and durability of fuel cell system 1A may be improved. Since process control of fuel cell system 1A is performed by controller 40 based on voltage information from the voltage detection means 30, accurate recognition of the gas replacement time can be improved, and it may be possible to prevent unnecessary waste of expensive fuel gas in the fuel gas exhaust, thereby improving fuel cell operating efficiency and reducing operating cost.

In this first embodiment, the estimated gas replacement completion time may be determined as a summation T of the first replacement estimation time T1, which is the elapsed time period from the time when the fuel supply starts to the time when the contents of fuel gas supply conduit 5 are replaced with fuel gas; the second replacement estimation time T2, which is the elapsed time period from the time when the contents of fuel gas supply conduit 5 are replaced with fuel gas to the time when the contents of the fuel chamber of fuel cell stack 2 are replaced with fuel gas; and third replacement estimation time T3, which is the elapsed time period from the time when the contents of the fuel chamber of fuel cell stack 2 are replaced with fuel gas to the time when the contents of fuel gas exhaust conduit 8 are replaced with fuel gas.

The first replacement estimation time T1 may be determined by the elapsed time from the time when the fuel supply starts to the time when the detected voltage of the voltage detection means 30 starts to rise. The second replacement estimation time T2 may be determined by the following formula: the volume of the fuel chamber of fuel cell stack 2, Vstack, is divided by the volume of fuel gas supply conduit 5, Vin, and the divided value is multiplied by first replacement estimation time T1, that is, T2=(Vstack/Vin)×T1. The third replacement estimation time T3 may be determined by the following formula: the volume of fuel gas exhaust conduit 8, Vout, is divided by the volume of fuel gas supply conduit 5, Vin, and the divided value is multiplied by the first replacement estimation time T1, that is T3=(Vout/Vin)×T1.

This estimation procedure can perform accurate estimations because the replacement speed of fuel gas can be determined by detecting the time point where fuel gas reaches the inside of fuel cell stack 2, using the fuel cell system operating voltage information determined by the voltage detection means 30. Thus, the estimated gas replacement completion time T can be simply estimated using the measured gas replacement speed and the known conduit volumes.

In this first embodiment, since the length of fuel gas recirculation conduit 11 is set to be shorter in comparison with the length of fuel gas exhaust conduit 8, components that potentially need replacing due to deterioration can be reduced as much as possible. Therefore, the amount of a gas mixture of fuel gas and an oxidizer gas in the fuel electrode chamber upon start of the fuel cell may be reduced, and the deterioration of the catalyst layer resulting from exposure to the mixture of fuel gas and oxidizer gas on fuel cell system start-up may be reduced or prevented. As for the length of fuel gas recirculation conduit 11, a shorter length may be preferable.

In another related embodiment, the pressure of fuel gas supplied to the fuel cell stack upon fuel cell start-up may be increased above the normal supply pressure (e.g. the steady state supply pressure) when the fuel cell is started-up. Consequently, the rate that fuel is supplied to the fuel cells can be increased. As a result, the gas replacement process may be performed quickly and accurately. Preferably, the initial setting pressure of valve for the fuel gas supply volume adjustment 7 upon start of the fuel cell is set to as high a pressure as possible in consideration of resist pressure of the fuel cell system (e.g. a plurality of unit fuel cells), so as to carry out fast fuel gas replacement.

In yet another related embodiment, the supply of oxidizer gas to the oxidizer gas chamber of fuel cell stack 2 may be started soon after the estimated gas replacement completion time has elapsed, so that electric power generation by the fuel cell system 1A can be achieved sooner, without facilitating the deterioration of the catalyst layer by exposure to a mixture of fuel gas and oxidizer gas upon start of the fuel cell. Thus, the fuel cell system start-up performance may be improved. Because the voltage of the voltage detection means 30 may be detected upon reaching the estimated gas replacement completion time point, and the amount of oxidizer gas supplied gets larger as this detected voltage is lower, electric power generation can be achieved more rapidly, regardless of the voltage level upon completion of the gas replacement completion time.

Figure 3:
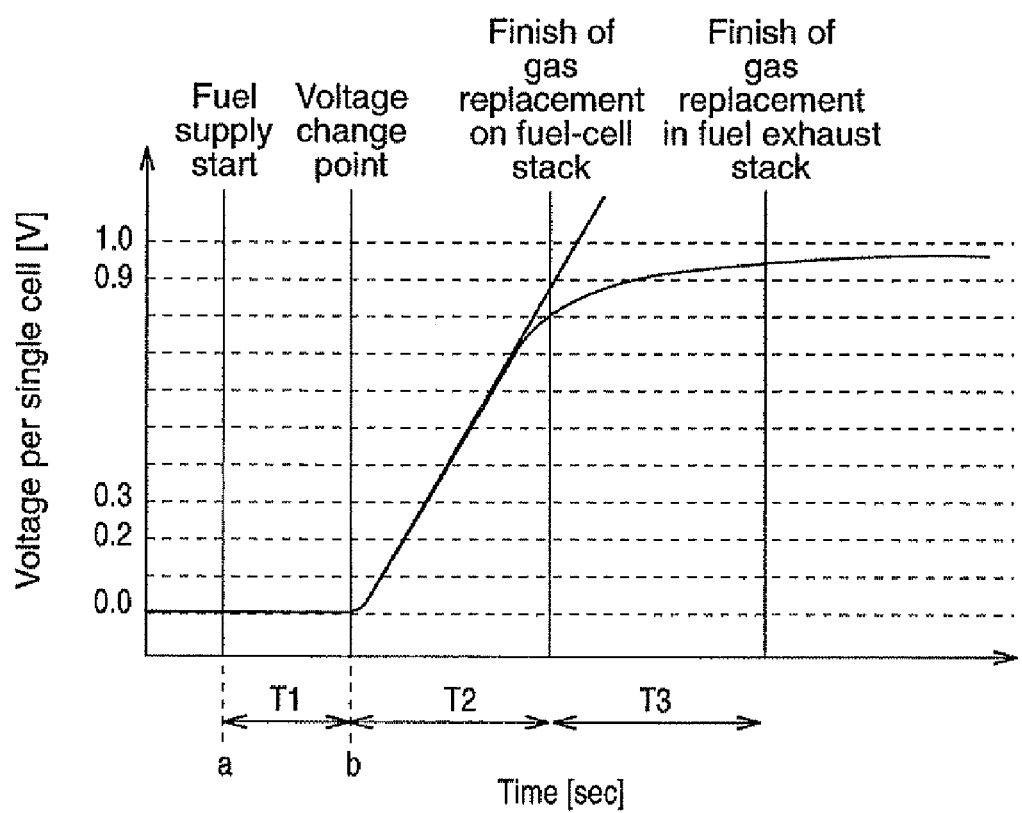
FIG. 3 is a diagram illustrating a characteristic graphical relationship between the fuel cell operating voltage as a function of time measured using a voltage sensor during fuel cell start-up, and describing another embodiment of the estimation procedure for determining the gas replacement completion time.

Another exemplary estimation procedure for gas replacement completion time T will now be described with respect to FIG. 3. In FIG. 3, the estimated gas replacement completion time T is a summation of first replacement estimation time T1, a second replacement estimation time T2 and a third replacement estimation time T3. The first replacement estimation time T1 is measured from the time point a when the fuel supply starts to the time when the contents of fuel gas supply conduit 5 are replaced with fuel gas at time point b. The second replacement estimation time T2 is measured from the time point b up to the time when the contents of the fuel chamber of fuel cell stack 2 are replaced with fuel gas. The third replacement estimation time T3 is measured from the time when the contents of the fuel chamber of fuel cell stack 2 are replaced with fuel gas up to the time when the contents of fuel gas exhaust conduit 8 are replaced with fuel gas.

The first replacement estimation time T1 may be determined by the time elapsed from when the fuel supply starts (point a in FIG. 3), to the time when the detected voltage of the voltage detection means 30 starts to rise (point b in FIG. 3). The second replacement estimation time T2 may be determined by the time elapsed from when the contents of the fuel gas supply to the time when the detected voltage value reaches a target voltage, which may be determined in the following manner: (1) dividing the voltage sensed by the voltage sensor 30 by the number of unit fuel cells in the fuel cell stack 1A to obtain a voltage per unit fuel cell of the fuel cell stack 1A; performing a linear approximation to the variation in voltage per unit fuel cell as a function of time from start-up to determine initial slope values (e.g. in the voltage zone of 0.2V-0.3 V in FIG. 3); and (2) comparing the initial slope values to a target slope value and setting replacement estimation time T2 to the elapsed time from fuel cell start-up required for the linear approximation based on the initial slope values to reaches a set target voltage (e.g. 0.9V in FIG. 3). The third replacement estimation time T3 may be determined by the following formula: the volume of fuel gas exhaust conduit 8, Vout, is divided by the volume of fuel gas supply conduit 5, Vin, and the resultant value is multiplied by the first replacement estimation time T1, i.e., T3=(Vout/Vin)×T1.

The gas replacement completion time T may thus be estimated more certainly and accurately regardless of the operational state of fuel cell stack 2 (e.g. immediately after starting the fuel cell system) when determined based on the measured operating voltage change of fuel cell stack 2. The target voltage may generally be selected to be a voltage corresponding to steady state operation of the fuel cell stack after oxidizer gas is provided to the oxidizer electrode chamber in quantities sufficient to achieve a steady measured fuel cell system operating voltage.

Yet another example estimation procedure for determining gas replacement completion time T will now be described. This estimation procedure is similar to the other estimation procedures described above, with the primary difference that the target voltage is determined from the slope of the linear approximation to the variation in voltage per unit fuel cell as a function of time from start-up to the second replacement estimation time T2.

Figure 4:
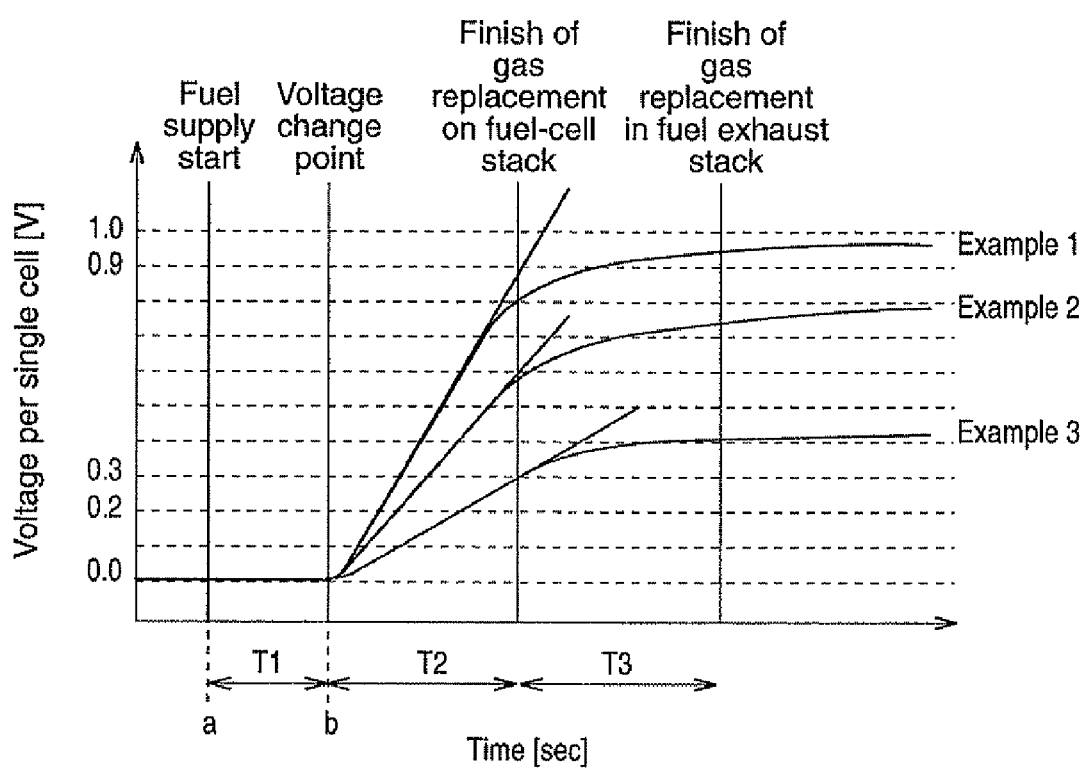
FIG. 4 is a diagram illustrating a characteristic graphical relationship between the fuel cell operating voltage as a function of time measured using a voltage sensor during fuel cell start-up, and describing a further embodiment of the estimation procedure for determining the gas replacement completion time.

As shown in FIG. 4, the slope of the approximate line may generally be determined by prior experimentation, and the target voltage may be determined according to the slope of the approximate line calculated. The target voltage may then be set to be lower as the initial slope of the approximate line decreases (e.g. in the order of Example 1>Example 2>Example 3 in FIG. 4). With this method, even in the case in which, for example, an oxidizer gas is not provided to the oxidizer electrode, the gas replacement completion time can be appropriately estimated, and an appropriate fuel cell system start-up can be performed.

Figure 5:
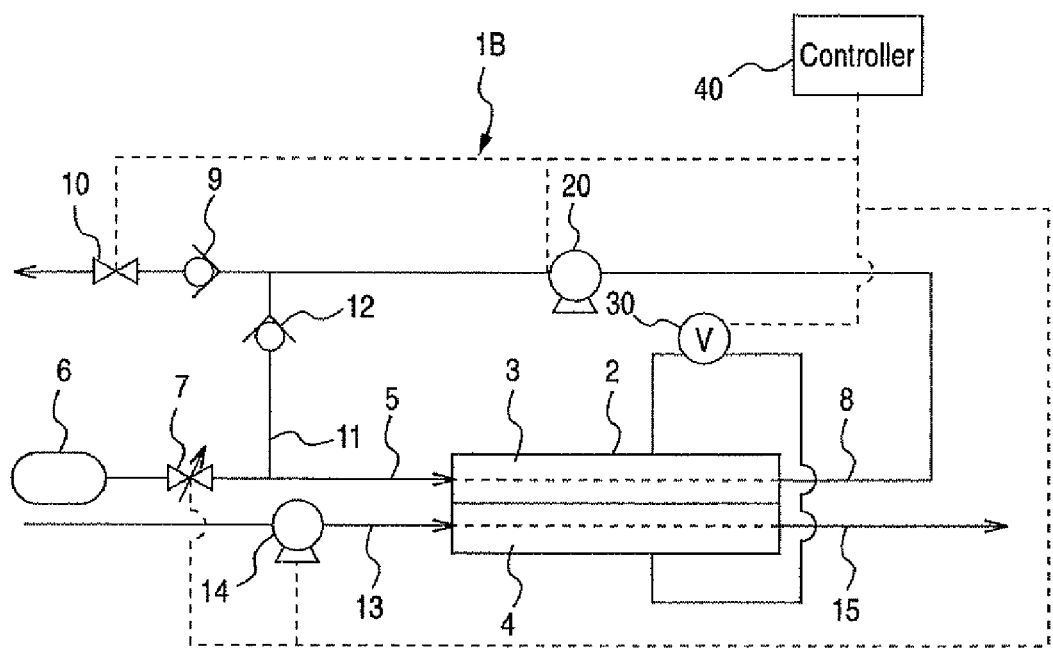
FIG. 5 is a schematic diagram illustrating a fuel cell system according to another embodiment.

FIG. 5 is a schematic diagram of a fuel cell system relating to a second embodiment. In FIG. 5, fuel cell system 1B of this second embodiment differs from that of FIG. 1 in that a circulation compressor 20 is positioned in the fuel gas exhaust conduit 8. Other components are the same with respect to FIG. 1, so the detailed description of FIG. 5 has been omitted to avoid duplication. The reference numerals in FIG. 5 refer to the same elements and structures as referenced in FIG. 1.

Start-up operations of the fuel cell in fuel cell system 18 of this second embodiment are similar to the first embodiment (FIG. 1), and the same influences and effects as the first embodiment can be obtained. The difference in operation upon start-up of the fuel cell is that circulation compressor (fuel gas circulation means) 20 is put in action before opening the fuel gas supply valve 7. More specifically, since circulation compressor 20 is put in action when fuel gas is supplied to fuel cell stack 2, fuel gas from fuel tank 6 fast and certainly reaches fuel gas supply conduit 5, the fuel chamber of fuel cell stack 2 and fuel gas exhaust conduit 8 to perform the gas replacement. Therefore, the deterioration of the catalyst layer by the mixture of fuel gas and an oxidizer gas when the fuel cell is started can be further controlled. In this second embodiment, circulation compressor (fuel gas circulation means) 20 is positioned in fuel gas exhaust conduit 8, but the same influences and effects can be obtained even by setting it upstream of the valve 12 for fuel gas recirculation conduit 11.

Figure 6:
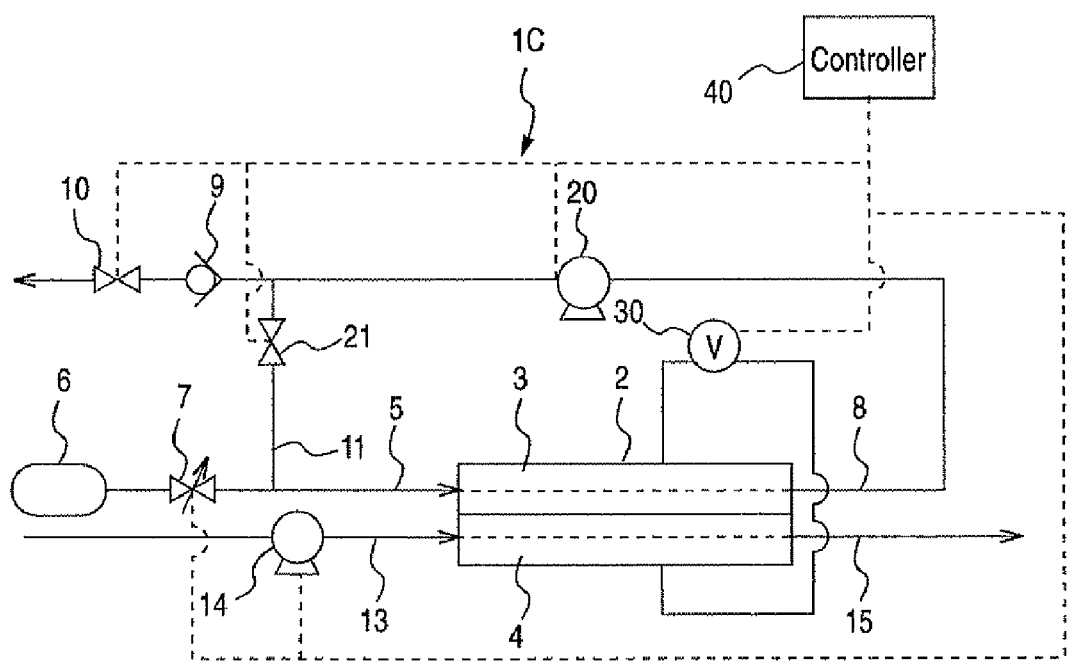
FIG. 6 is a schematic diagram illustrating a fuel cell system according to an additional embodiment.

FIG. 6 is a schematic diagram of fuel cell system 1C relating to the third embodiment. In FIG. 6, fuel cell system 1C of this third embodiment differs in the point that valve 21 for the fuel gas recirculation conduit 11 is positioned by changing fuel gas recirculation conduit 11 to a return check valve comparable with the one 10 in the second embodiment. Since other components are the same, the explanations have been omitted to avoid duplication. In addition, the same codes point to the same structure items in FIG. 6.

Start-up operations of the fuel cell in fuel cell system 1C of this third embodiment are similar to the second embodiment described in FIG. 5, and the same influences and effects as the second embodiment can be obtained. The difference in operation upon start-up of the fuel cell is that fuel gas is also supplied to fuel gas recirculation conduit 11 by opening the valve 21 for the fuel gas recirculation conduit 11 as well, when the fuel gas vent valve 10 is opened. Fuel gas flows through the valve 21 for the fuel gas recirculation conduit 11, and the gas replacement of all fuel conduits may thereby be performed. Therefore, the mixture gas of fuel gas and an oxidizer gas can be prevented from being supplied to the fuel cell stack, and the deterioration by the mixture gas can be certainly controlled.

Also, since circulation compressor 20 utilized as in the second embodiment, the fuel gas is more effectively circulated in fuel gas recirculation conduit 11. The fuel gas vent valve 10 is closed at the estimated gas replacement completion time T, but the valve 21 for the fuel gas recirculation conduit 11 is closed sooner.

Various embodiments of the invention have been described. These and other embodiments are within the scope of the following claims.

The invention claimed is:

1. A fuel cell system comprising:
   a fuel cell stack that generates electricity;
   an exhaust conduit for exhausting a portion of the fuel cell stack;
   an exhaust valve that externally vents a fuel gas from a fuel chamber of the fuel cell stack and through the exhaust conduit;
   a supply conduit for supplying a newly supplied fuel gas to the fuel cell stack; and
   a controller configured to determine a point in time at which a voltage produced by the fuel cell stack starts to rise configured to compute an estimated time, to replace an oxidant gas in the supply conduit, the fuel chamber and the exhaust conduit with the newly supplied fuel gas based on the point in time, and configured to replace the oxidant gas, at a time of starting-up the fuel cell system by maintaining the exhaust valve in an open position and by closing the exhaust valve upon expiration of the estimated time.

2. The fuel cell system according to claim 1, wherein the fuel gas supplied to the fuel chamber at the time of starting-up the fuel cell system has a pressure greater than a pressure corresponding to steady-state operation of the fuel cell stack.

3. The fuel cell system according to claim 1, wherein an oxidizer gas is supplied to an oxidizer chamber upon expiration of the estimated time.

4. The fuel cell system of claim 1, further comprising:
   a sensor electrically connected to the fuel cell stack to sense the voltage produced by the fuel cell stack.

5. The fuel cell system of claim 1, further comprising:
   a recirculation conduit coupled to the exhaust conduit at a diversion point and positioned to divert a portion of the fuel gas from the exhaust conduit and recirculate the diverted portion of the fuel gas to the fuel cell stack.

6. The fuel cell system according to claim 5, wherein the length of the recirculation conduit is less than the length of the fuel gas exhaust conduit.

7. The fuel cell system according to claim 5, further comprising:
   a fuel gas recirculation valve positioned in flow communication with the recirculation conduit downstream from the diversion point; and wherein the controller is configured to control the fuel gas recirculation valve to divert the portion of the fuel gas from the exhaust conduit to the supply conduit.

8. The fuel cell system according to claim 5, further comprising a compressor coupled to the recirculation conduit to supply the diverted portion of the fuel gas to the fuel cell stack.

9. The fuel cell according to claim 8, wherein the controller is configured to engage the compressor when the fuel gas is supplied to the supply conduit.

10. The fuel cell system according to claim 5, further comprising:
    a first check valve coupled to the exhaust conduit and positioned to allow irreversible flow of fuel gas through the exhaust valve.

11. The fuel cell system according to claim 10, further comprising:
    a second check valve coupled to a recirculation conduit and positioned to allow irreversible flow of the diverted portion of the fuel gas to the supply conduit.

12. The fuel cell system according to claim 1:

wherein the controller is configured to compute the estimated time as a summation of:
a first time measured from the time of starting-up the fuel cell system to a time when contents of the supply conduit are replaced with the newly supplied fuel gas,
a second time measured from the time when the contents of the supply conduit are replaced with the newly supplied fuel gas to a time when contents of the fuel chamber are replaced with the newly supplied fuel gas, and
a third time measured from the time when the contents of the fuel chamber are replaced with the newly supplied fuel gas to a time when contents of the exhaust conduit are replaced with the newly supplied fuel gas.

13. The fuel cell system of claim 12, further comprising:
a sensor electrically connected to the fuel cell stack to sense the voltage produced by the fuel cell stack.

14. The fuel cell system according to claim 13,
wherein the sensor detects that the fuel cell stack has reached a steady state operating voltage operation after expiration of the estimated time, and
a rate of oxidizer gas supply to an oxidizer chamber is thereafter increased.

15. The fuel cell system according to claim 13, wherein the first time is computed by determining an elapsed time from the time of starting-up the fuel cell system to the point in time at which the voltage of the fuel cell stack starts to rise.

16. The fuel cell system according to claim 13, wherein the second time is computed by determining an elapsed time from the point in time at which the voltage of the fuel cell stack starts to rise to a time when the sensor first detects that the fuel cell stack has reached a target voltage.

17. A fuel cell system comprising:
a fuel cell stack that generates electricity;
an exhaust valve that externally vents a fuel gas from a fuel chamber of the fuel cell stack
a sensor electrically connected to the fuel cell stack to sense a voltage produced by the fuel cell stack;
a supply conduit to supply the fuel gas to the fuel cell stack;
an exhaust conduit to exhaust a portion of the fuel gas from the fuel cell stack; and
a controller configured to compute an estimated time to replace an oxidant gas in at least the fuel chamber with the fuel gas, wherein at a time of starting-up the fuel cell system the controller is configured to maintained the exhaust valve in an open position for the estimated time;
wherein the controller is configured to compute the estimated time as a summation T of:
a first time T1 measured from the time of starting-up the fuel cell system to a time when contents of the supply conduit are replaced with fuel gas,
a second time T2 measured from the time when the contents of the supply conduit are replaced with fuel gas to a time when contents of the fuel chamber are replaced with fuel gas, and
a third time T3 measured from the time when the contents of the fuel chamber are replaced with fuel gas to a time when contents of the exhaust conduit are replaced with fuel gas; and
wherein the controller is configured to calculate the second time T2 by:
dividing the voltage sensed by the sensor by a number of unit fuel cells in the fuel cell stack to obtain a voltage per unit fuel cell of the fuel cell stack;
performing a linear approximation to the variation in voltage per unit fuel cell as a function of time from start-up to determine initial slope values;
comparing the initial slope values to a target slope value; and
setting replacement estimation time T2 to the elapsed time from the time when the sensor first detects the increase in the voltage of the fuel cell stack to a time required for the initial slope values to equal the target slope value.

18. The fuel cell system according to claim 13,
wherein the first time is computed by determining an elapsed time from the time of starting-up the fuel cell system to the point in time at which the voltage of the fuel cell stack starts to rise;
the second time is computed by dividing a volume of the fuel chamber by a volume of the supply conduit and multiplying by the first time; and
the third time is computed by dividing a volume of the exhaust conduit by a volume of the supply conduit and multiplying by the first time.

19. The fuel cell system according to claim 13,
wherein the first time is computed by determining an elapsed time from the time of starting-up the fuel cell system to the point in time at which the voltage of the fuel cell stack starts to rise;
the second time is computed by determining an elapsed time from the point in time at which the voltage of the fuel cell stack starts to rise to a time when the sensor first detects that the fuel cell stack has reached a target voltage; and
the third time is computed by dividing a volume of the exhaust conduit by a volume of the supply conduit and multiplying by the first time.

20. The fuel cell system according to claim 12, wherein the second time is computed by dividing a volume of the fuel chamber by a volume of the supply conduit and multiplying by the first time.

21. The fuel cell system according to claim 12, wherein the third time is computed by dividing a volume of the exhaust conduit by a volume of the supply conduit and multiplying by the first time.

22. A method for operating a fuel cell system, comprising:
supplying a newly supplied fuel gas through a supply conduit to a fuel cell stack that generates electricity;
opening an exhaust valve that externally vents the newly supplied fuel gas from a fuel chamber of the fuel cell stack and through an exhaust conduit;
determining a point in time at which a voltage produced by the fuel cell stack starts to rise using a controller;
computing an estimated time, based on the point in time, to replace an oxidant gas in the supply conduit, the fuel chamber and the exhaust conduit with the newly supplied fuel gas using the controller; and
replacing the oxidant gas at a time of start-up the fuel cell system by maintaining the exhaust valve in an open position and by closing the exhaust valve upon expiration of the estimated time using the controller.

23. The method according to claim 22, wherein supplying the newly supplied fuel gas to the fuel cell stack comprises supplying the newly supplied fuel gas at a pressure greater than a pressure corresponding to steady-state operation of the fuel cell stack.

24. The method according to claim 22, further comprising:
sensing the voltage produced by the fuel cell stack using a sensor.

25. The method according to claim 22, further comprising:
supplying an oxidizer gas to an oxidizer chamber of the fuel cell stack upon expiration of the estimated time.

26. The method according to claim 25, further comprising:

sensing a voltage corresponding to a steady state operating voltage of the fuel cell stack after expiration of the estimated time, and thereafter increasing a flow rate of the oxidizer gas supplied to the oxidizer chamber of the fuel cell stack.

27. The method according to claim 22, further comprising:
recirculating a portion of the fuel gas from the exhaust conduit to the supply conduit.

28. The method according to claim 22, further comprising:
computing the estimated time as a summation of:
a first time measured from the time of starting-up the fuel cell system to a time when contents of the supply conduit are replaced with the newly supplied fuel gas,
a second time measured from the time when the contents of the supply conduit are replaced with the newly supplied fuel gas to a time when contents of the fuel chamber are replaced with the newly supplied fuel gas, and
a third time measured from the time when the contents of the fuel chamber are replaced with the newly supplied fuel gas to a time when contents of the exhaust conduit are replaced with the newly supplied fuel gas.

29. The method according to claim 28, further comprising:
sensing the voltage produced by the fuel cell stack using a sensor.

30. The method according to claim 29, further comprising:
computing the first time as an elapsed time from the time of starting-up the fuel cell system to the point in time at which the voltage of the fuel cell stack starts to rise.

31. The method according to claim 29, further comprising:
computing the second time T2 as an elapsed time from the point in time at which the voltage of the fuel cell stack starts to rise to a time when the sensor first detects that the fuel cell stack has reached a target voltage.

32. The method according to claim 29, further comprising:
computing the second time by dividing the voltage sensed with the sensor by a number of unit fuel cells in the fuel cell stack to obtain a voltage per unit fuel cell of the fuel cell stack;
performing a linear approximation to the variation in voltage per unit fuel cell as a function of time from the point in time at which the voltage produced by the fuel cell stack starts to rise to determine initial slope values;
comparing the initial slope values to a target slope value; and
setting the second time to an elapsed time from the point in time at which the voltage of the fuel cell stack starts to rise to a time required for the initial slope values to equal the target slope value.

33. The method according to claim 29, further comprising:
computing the first time as an elapsed time from the time of starting-up the fuel cell system to the point in time at which the voltage of the fuel cell stack starts to rise;
computing the second time by dividing a volume defined by the fuel chamber by a volume defined by the supply conduit and multiplying by the first time; and
computing the third time by dividing a volume of the exhaust conduit by the volume of the supply conduit and multiplying by the first time.

34. The method according to claim 29, further comprising:
computing the first time as an elapsed time from the time of starting-up the fuel cell system to the point in time at which the voltage of the fuel cell stack starts to rise;
computing the second time as an elapsed time from the point in time at which the voltage of the fuel cell stack starts to rise to a time when the sensor first detects that the fuel cell stack has reached a target voltage; and
computing the third time by dividing a volume of the exhaust conduit by a volume of the supply conduit and multiplying by the first time.

35. The method according to claim 28, further comprising:
computing the second time by dividing a volume of the fuel chamber by a volume of the supply conduit and multiplying by the first time.

36. The method according to claim 28, further comprising:
computing the third time by dividing a volume of the exhaust conduit by a volume of the supply conduit and multiplying by the first time.

37. The method of claim 22, further comprising:
opening a recirculation valve to recirculate a portion of the exhaust gas to the fuel chamber at the time of starting-up the fuel cell system.

38. The method of claim 37, further comprising:
closing the recirculation valve after the estimated time has elapsed and before closing the exhaust valve.

39. The fuel cell system according to claim 13, wherein the second time is computed by:
dividing the voltage sensed by the sensor by a number of unit fuel cells in the fuel cell stack to obtain a voltage per unit fuel cell of the fuel cell stack;
performing a linear approximation to the variation in voltage per unit fuel cell as a function of time from the point in time at which the voltage produced by the fuel cell stack starts to rise to determine initial slope values;
comparing the initial slope values to a target slope value; and
setting the second time to an elapsed time from the point in time at which the voltage of the fuel cell stack starts to rise to a time required for the initial slope values to equal the target slope value.

* * * * *